(12) United States Patent
West et al.

(10) Patent No.: US 10,967,982 B2
(45) Date of Patent: Apr. 6, 2021

(54) MOTOR MOUNTING SYSTEM

(71) Applicant: HFE INTERNATIONAL, Tucson, AZ (US)

(72) Inventors: Thomas B. West, Tucson, AZ (US); Kyle Gratien, Tucson, AZ (US)

(73) Assignee: HFE International, Tucson, AZ (US)

( * ) Notice: Subject to any disclaimer, the term of this patent is extended or adjusted under 35 U.S.C. 154(b) by 0 days.

(21) Appl. No.: 16/393,776

(22) Filed: Apr. 24, 2019

(65) Prior Publication Data

US 2020/0339270 A1 Oct. 29, 2020

(51) Int. Cl.
| | | |
|---|---|---|
| *B64D 27/26* | (2006.01) | |
| *F16M 13/02* | (2006.01) | |
| *F16F 15/08* | (2006.01) | |
| *F16F 1/36* | (2006.01) | |

(52) U.S. Cl.
CPC ............... *B64D 27/26* (2013.01); *F16F 1/36* (2013.01); *F16F 15/08* (2013.01); *F16M 13/022* (2013.01); *B64D 2027/264* (2013.01)

(58) Field of Classification Search
CPC ...... H02K 5/24; B64C 1/16; B64C 2027/002; B64D 2027/264
USPC .......................................................... 248/638
See application file for complete search history.

(56) References Cited

U.S. PATENT DOCUMENTS

| | | | | |
|---|---|---|---|---|
| 5,126,607 A | * | 6/1992 | Merriman, Jr. .......... | H02K 5/24 248/638 |
| 5,696,360 A | * | 12/1997 | Tiemeyer ................ | H02K 5/24 181/202 |
| 6,021,993 A | * | 2/2000 | Kirkwood ............... | H02K 5/24 248/634 |
| 6,378,834 B1 | * | 4/2002 | Baker ..................... | F16F 1/428 248/674 |
| 6,547,208 B2 | * | 4/2003 | Arnold .................... | F16M 1/00 248/672 |
| 9,347,509 B2 | * | 5/2016 | Oppenheimer .......... | F16F 1/36 |
| 10,358,213 B2 | * | 7/2019 | Freeman ................ | B64C 27/001 |
| 2003/0098622 A1 | * | 5/2003 | Lino ....................... | H02K 1/185 310/89 |
| 2007/0222310 A1 | * | 9/2007 | Drexlmaier ............. | H02K 5/24 310/51 |
| 2009/0058203 A1 | * | 3/2009 | Pettitt ................... | F04D 25/0606 310/51 |
| 2013/0193784 A1 | * | 8/2013 | Zheng .................... | H02K 1/185 310/51 |
| 2017/0025917 A1 | * | 1/2017 | D'Ambrosio .......... | H02K 5/136 |
| 2017/0088280 A1 | * | 3/2017 | Beckman ............... | B64C 39/024 |
| 2019/0103783 A1 | * | 4/2019 | Kondo ................... | F04D 17/165 |
| 2019/0238026 A1 | * | 8/2019 | Rohrer .................... | H02K 5/24 |
| 2019/0376530 A1 | * | 12/2019 | Gontier ................. | F04D 29/668 |
| 2020/0096008 A1 | * | 3/2020 | Browne ................... | H02K 5/24 |

* cited by examiner

*Primary Examiner* — Bradley Duckworth
(74) *Attorney, Agent, or Firm* — Quarles & Brady LLP

(57) ABSTRACT

Systems and methods for mounting motors include a housing configured to secure motor supported by a motor support framework coupled to and housed within the housing. The motor support framework is suspended from the housing by one or more pluralities of vibration isolation devices. The housing is provided with a mounting surface configured couple the housing a quick-connect bracket disposed on a bulkhead or other structural element.

18 Claims, 5 Drawing Sheets

MOTOR MOUNTING SYSTEM

BACKGROUND

Small engines, such as motors for unmanned aerial vehicles (UAVs) are frequently secured within a fuselage or other structure. In order to improve ease of maintenance, a motor may be secured in such a way that it may be removed for servicing or replacement in the event of a failure. In order to secure a motor while still allowing it to be easily removed, conventional approaches secure the motor directly to a bulkhead or other structure at several points or to a cradle. In such approaches, the mounting arrangement frequently includes vibration isolation devices to prevent mechanical damage to the motor and surrounding structures during operation. Excess vibration is also undesirable in combustion engines, which may deviate from their intended operational parameters (e.g., fuel-air ratio) when exposed to strong vibrations.

SUMMARY

Conventional approaches such as those described above have deficiencies. Mounting arrangements must be customized to each motor and fuselage and the motor must be rigidly attached using bolts, screws, or other fasteners. Both installation and removal of the motor can be cumbersome, requiring the insertion or removal of numerous fasteners as well as coupling and decoupling of vibration isolation components. Furthermore, the motor will typically require adjustment after installation due to differences between motor performance in standalone conditions and motor performance in the particular mounting arrangement of a given aircraft.

Improved motor mounting systems and methods disclosed herein address these and other deficiencies of conventional motor mounting systems and methods by enabling a motor to be secured within a modular housing configured to mate with quick-connect and quick-disconnect mounting bracket. The mounting bracket may be secured to a bulkhead or other structural member of an apparatus (e.g., an aircraft). In these systems, a motor can be easily removed and quickly replaced with a new motor, without requiring an end user to have numerous tools and/or locate and remove numerous fasteners. In addition, vibration isolation is provided within the modular motor housing, eliminating the need to design, install, and optimize vibration isolation hardware in an aircraft prior to installation of the motor. Furthermore, because the motor (potentially along with various electrical control subsystems) is packaged in a modular housing which includes vibration isolation, motor performance can be tuned once at the time of assembly without the need for additional tuning after motor installation.

In an embodiment, a motor mounting system comprises a mounting surface configured to form an exterior face of a housing. The mounting surface is configured to fixedly fasten to a structural member by mating with a quick-connect bracket disposed on the structural member. The system further comprises a motor support framework configured to couple to an interior face of the housing opposite the mounting surface and an extended support configured to form part of the housing by coupling to an outer edge of the housing near the mounting surface.

In certain embodiments, the extended support, when arranged to form part of the housing, is a cantilevered support extending along a cantilever axis perpendicular to the mounting surface. When the extended support is so arranged, it has first end coupled to the outer edge of the housing near the mounting surface; and second end configured to couple to the motor support framework by a plurality of vibration isolation devices near the second end, the plurality of vibration devices including at least a first isolator and a second isolator. When motor support framework is assembled as part of the housing and configured to support a motor the first and second isolators are disposed symmetrically with respect to a lateral midplane of the motor support framework. When the motor support framework is so assembled, it is configured to be at least partially suspended from the cantilevered support by the plurality of vibration isolation devices in a vertical direction substantially perpendicular to the cantilever axis and substantially parallel to the lateral midplane, which is parallel to the cantilever axis and substantially perpendicular to a surface of the cantilevered support.

In another embodiment, a motor mounting system comprises a housing having a mounting surface configured to form an exterior rear face of the housing and further configured to be fixedly fastened to a structural member. The system further comprises a motor support framework configured to couple to an interior rear face of the housing opposite the exterior rear face of the housing; and an extended support configured to couple to an outer edge of the mounting surface. The extended support has a first end coupled to an outer edge of the interior rear face of the housing; and a second end coupled to the motor support framework by a set of vibration isolation devices near the second end. The outer edge extends between the exterior rear face and the interior rear face of the housing and is provided with a set of recesses, each recess dimensioned to receive a keyed fastener dimensioned to fixedly engage that recess.

The system may further comprise a mounting bracket having a bracket body, the mounting bracket being a quick-connect bracket. The system may still further comprise a plurality of clips extending from the bracket body, each clip having a proximal end coupled to the bracket body and a distal end having a protrusion forming a key dimensioned to engage a corresponding recess in the outer edge of the housing.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the terms "embodiments of the invention," "embodiments" or "invention" do not require that all embodiments of the method, system or apparatus include the discussed feature, advantage or mode of operation.

Terms indicating relative position such as "above," "below," "upper," "lower," "rear," "front," et al. are used for purposes of illustration only, unless otherwise noted and are made with reference to the orientation of the drawings. It should be understood that these terms are not generally meant to indicate a preferred orientation when such an orientation is not inherently or explicitly required.

The terms "quick-connect" and "quick-disconnect" are used interchangeably below to describe brackets and other related fixtures which can be coupled and uncoupled from a mating part without the need for tools and preferably by use of one or more hands of a human operator of average (or even below average) physical ability.

The description below makes reference to uses of embodiments described herein in aircraft. Such references are intended for ease of understanding and not to limit embodiments to use in aircraft.

Figure 1:
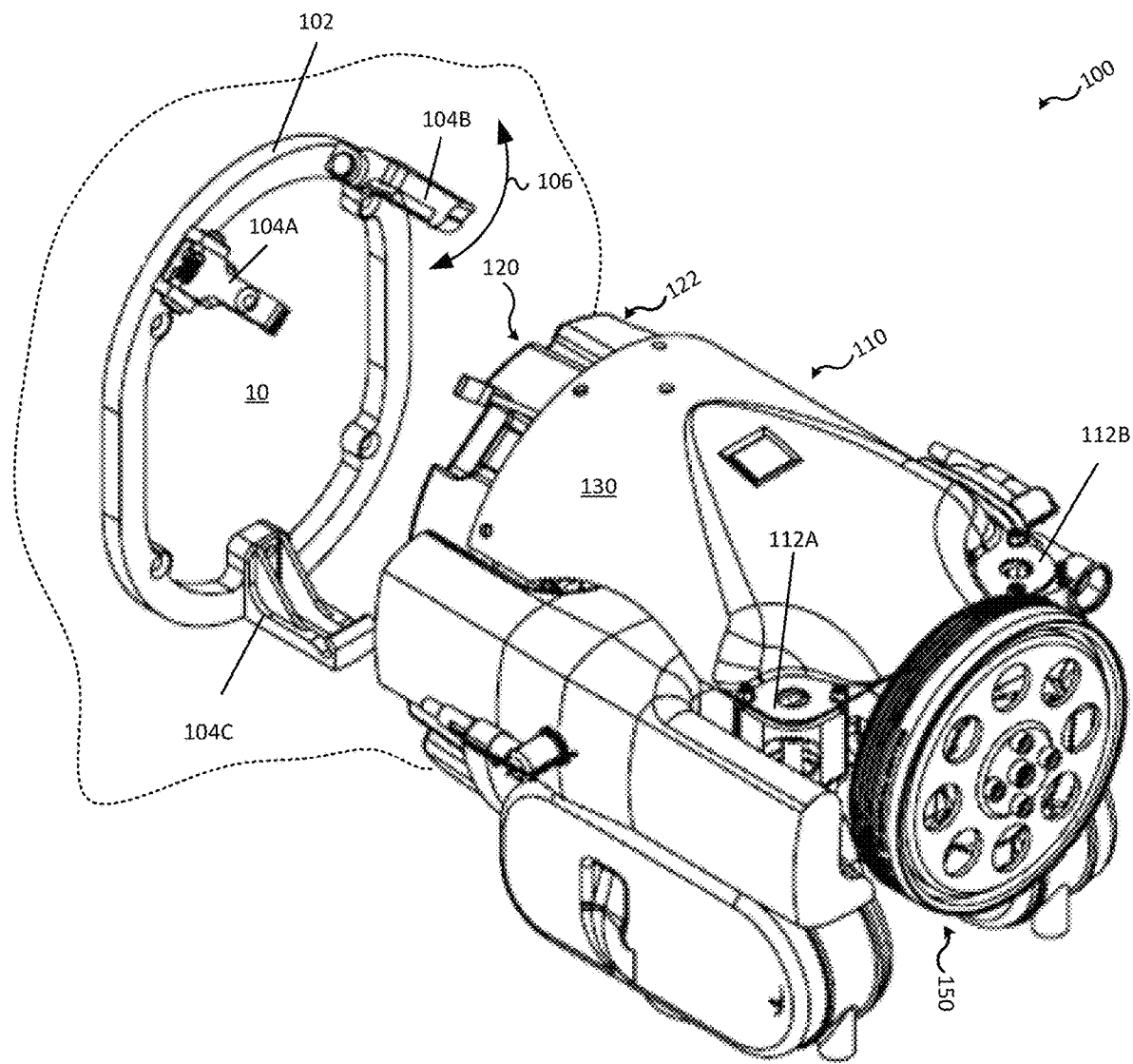
FIG. 1 is a front perspective view of an example embodiment of an improved motor mounting system being used to support a motor.

FIG. 1 is a front perspective view of an example embodiment 100. As shown, various components have been assembled to form a housing 110 which encloses and supports a motor 150 (visible as rotor protruding from the housing 110). The housing 110 has a mounting surface 120 with an extended edge 122. A cantilevered support 130 coupled to the mounting surface 120, forming part of the housing 110. The cantilevered support is coupled to vibration isolation devices (shown here as rubber isolators 112A, 112B) which couple to a structure (shown in later figures) within the housing 110 to suspend the motor 150 at least partially from the cantilevered support 130 (shown in this example as an extended cowling). The mounting surface 120 is configured to couple to a quick-connect bracket 102. The bracket 102 may in turn be anchored to an aircraft bulkhead or other suitable structural component such as the example bulkhead 10 of FIG. 1. In certain embodiments the bracket 102 has an elliptical annular shape as shown in FIG. 1 to reduce weight and to allow access to the motor 150 through the bulkhead 10, if desired. For example, the bulkhead 10 and the mounting surface 120 may be supplied additional quick-connect fixtures (see description of FIG. 4, below for an example) such that, when the housing 110 is coupled to the bracket 102, the motor 150 is also coupled to fuel and/or electrical power and signal lines provided through feedthroughs in the bulkhead 10

The bracket 102 is supplied with a set of fasteners 104, shown in FIG. 1 as clips 104A, 104B, and 104C. The fasteners 104 are configured to engage with corresponding recesses in the extended edge 122 of the mounting surface 120. In certain preferred embodiments, one or more of the fasteners 104 is spring-loaded and keyed such that the housing can be attached to the bracket 102 by aligning the recesses of the mounting surface 120 with the fasteners 104 and pushing the housing 110 against the bracket 102. For example, in embodiment 100, doing so "opens" the clips 104A, 104B against the force of the springs which tend to hold the clips 104A, 104B in a "closed" position. In the closed position, the clips 104A, 104B, 104C are oriented with their distal ends oriented substantially perpendicular to the plane of the bracket. To mount the housing 110 on the bracket 102, the housing 110 is aligned with the bottom clip 104C (which is stationary in this example) supporting the housing 110. The housing 110 may then be pivoted into position while resting against clip 104C until the keys of the top clips 104A, 104B grasp the recesses in the mounting surface 120, thus fixing the housing 110 to the bracket 102. It should be understood that that any arrangement of fasteners 104 and springs suitable for the purposes described may be chosen. One or more of the fasteners 104 may be provided with one or more holes for allowing a screw or bolt or pass through in order to further secure the housing 110 to the bracket 102 once they have been mated together (see, as an example, clip 104A depicted with a recessed hole)

Figure 2:
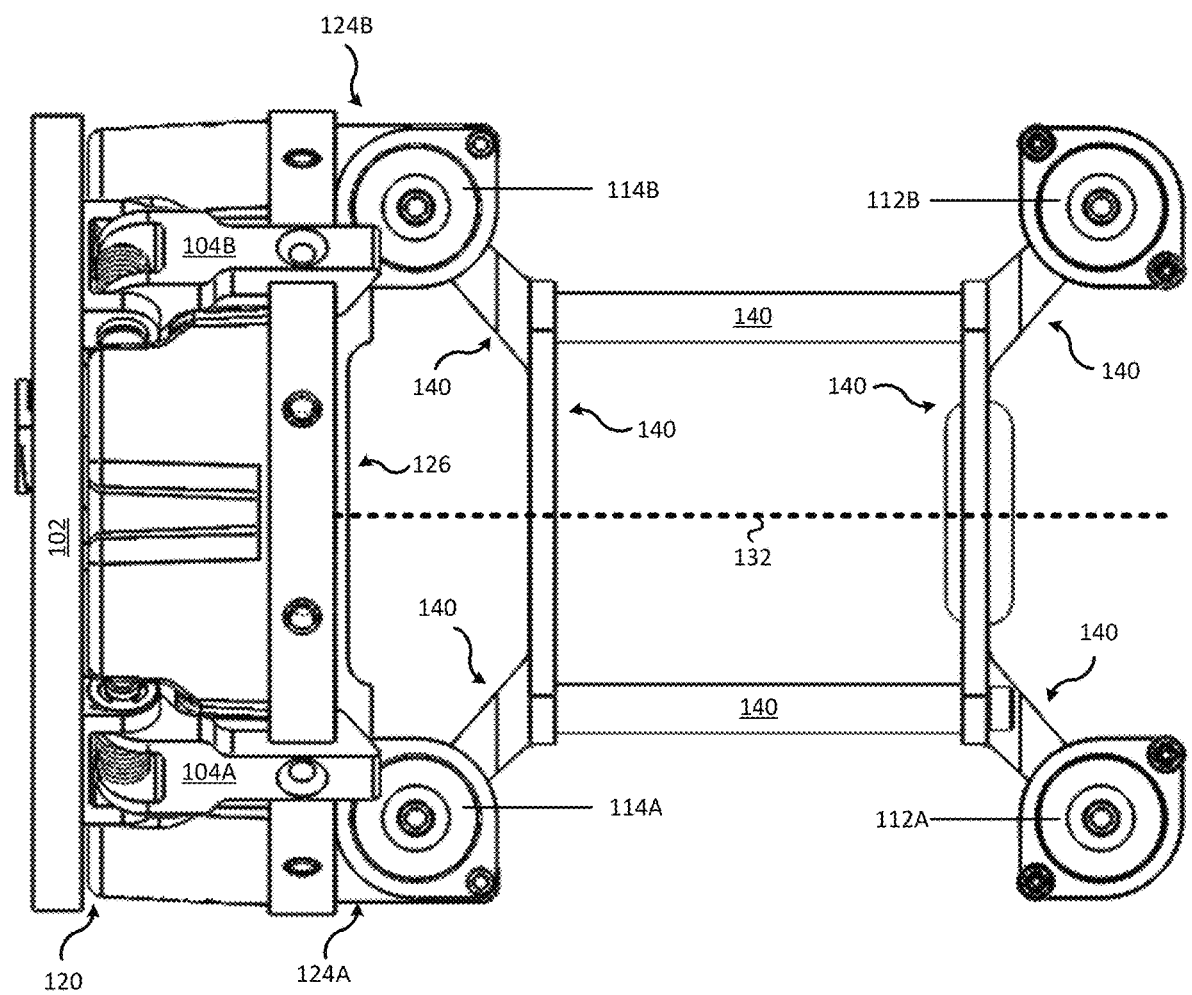
FIG. 2 is an overhead view of elements of the example embodiment of FIG. 1

FIG. 2 is a top view of embodiment 100 with various external components removed to reveal a motor support framework 140. The motor support framework 140 is designed to be assembled around a motor such as the motor 150 and to provide a means of suspending a motor within the housing 110. The view of FIG. 2 shows the mounting surface 120 at the rear exterior of the housing 110 mated with the bracket 102. The motor support framework 140 is coupled to two pairs of isolators (112A, 112B and 114A, 114B) which suspend the motor support framework 140 within the housing 110 as described further below. The isolators 114A, 114B are coupled respectively to vertical supports 124A, 124B extending from the interior rear surface 126 of the housing 110 behind the mounting surface 120. As shown previously in FIG. 1, the isolators 112A, 11B are coupled to the cantilevered support 130. The motor support framework 140 is suspended within the housing 110 from the isolators. Each pair of isolators is positioned symmetrically about a lateral midplane of the motor support framework 140 (indicated by dashed line 132 which corresponds to the line of intersection between the lateral midplane and the plane of the figure), reducing the tendency of the motor 150 to rotate about the lateral midplane during operation.

Figure 3:
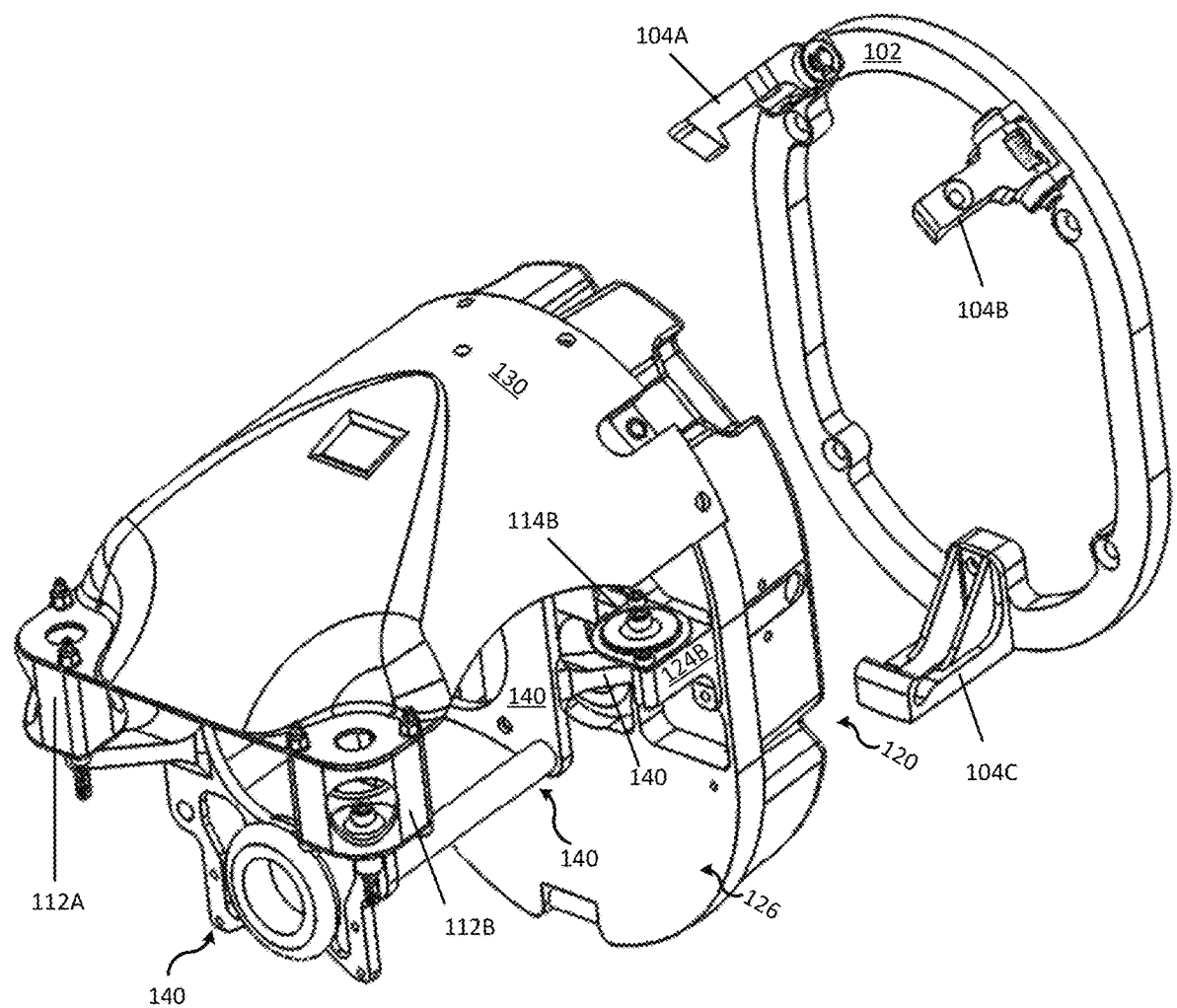
FIG. 3 is a front perspective view of elements of the embodiment of FIG. 1

FIG. 3 is a rear perspective view of embodiment 100 with the lower portion of the housing 110 removed. In this view, the motor support framework 140 is shown assembled and suspended by both pairs of isolators (isolators 112A, 112B and 114B are visible). The motor support framework 140 is suspended vertically form the cantilevered support 130 (by respective isolators 112A, 112B) and from the vertical supports 124A, 124B (by respective isolators 114A, 114B)

Figure 4:
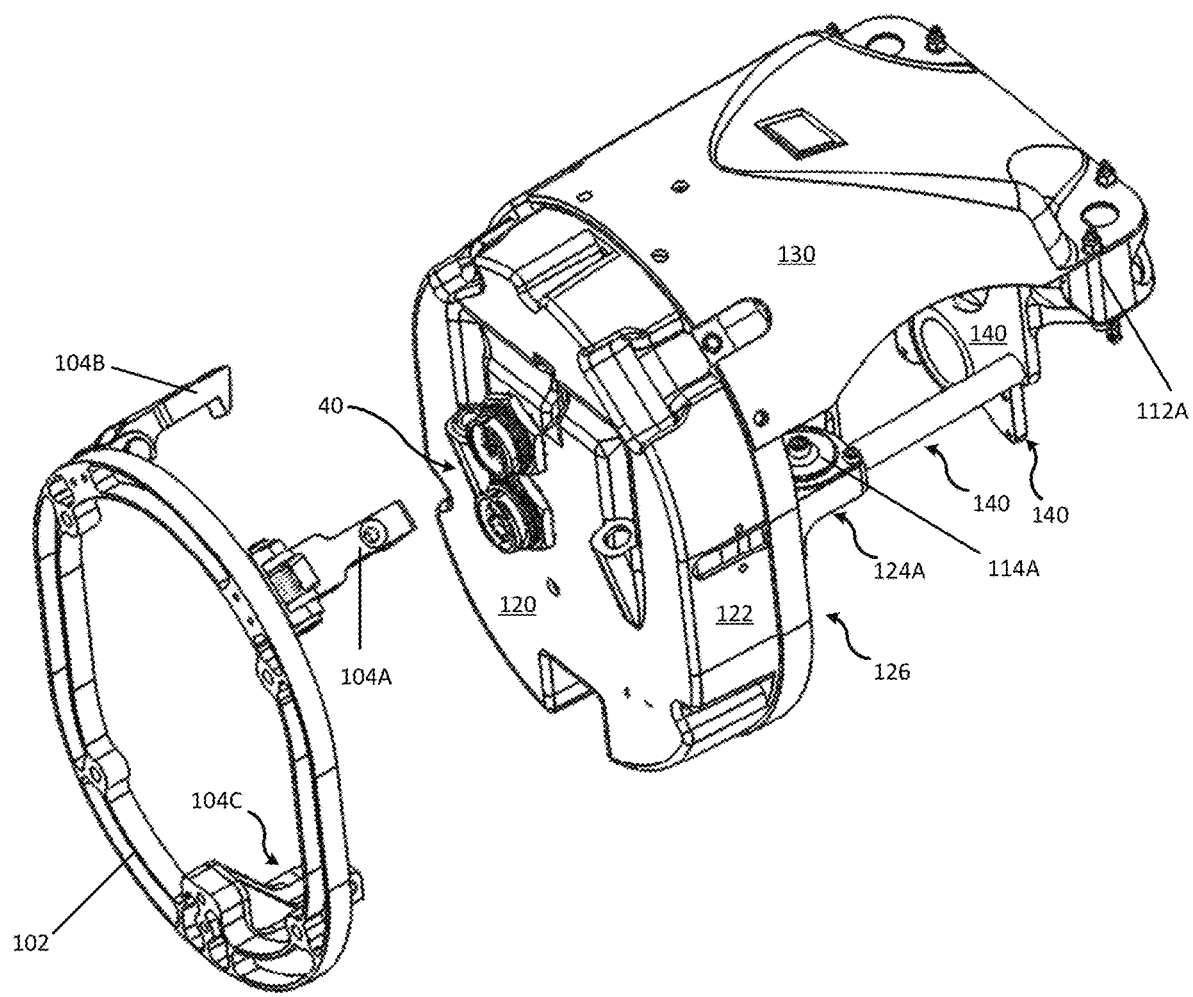
FIG. 4 is a rear perspective view of elements of the embodiment of FIG. 1

FIG. 4 is a front perspective view of embodiment 100 with the lower portion of the housing 110 removed. In this view, the mounting surface 120 is shown optionally provided with connectors 40 which may be used for providing electrical power and/or fuel to the motor. The connectors 40 may be coupled directly to the motor or connected by short lengths of cabling or tubing, as appropriate. In some embodiments, these connectors are conventional quick-connect cable receptacles, which allow cables (such as an electrical cable or fuel hose) to be coupled and uncoupled from the connectors by hand by pressing (or pulling) on the connectors or the housing 110, without the need for tools.

Figure 5:
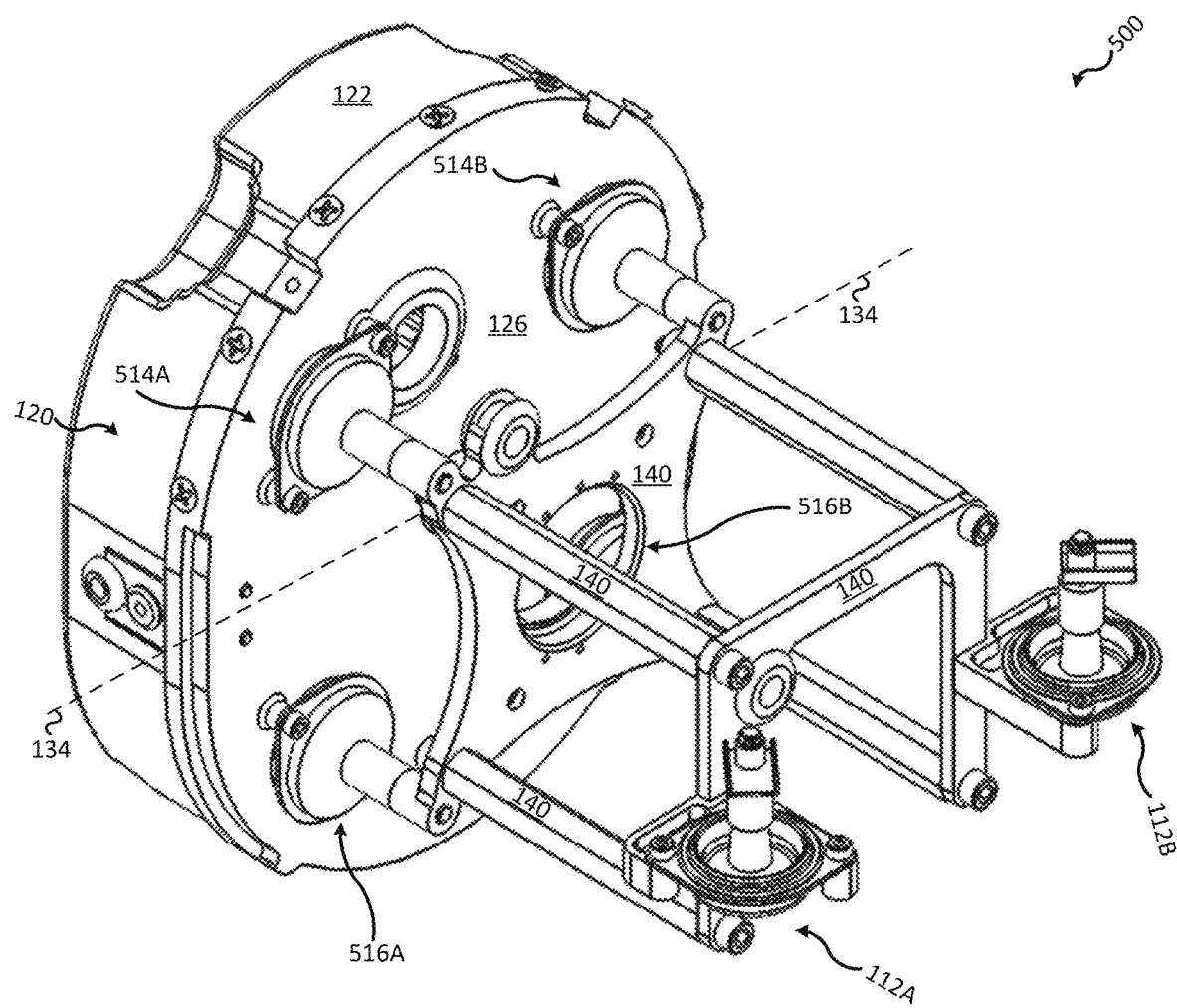
FIG. 5 is a front perspective view of elements of an alternate embodiment related to the embodiments of FIGS. 1-4.

FIG. 5 is a front perspective view of elements of an alternate embodiment 500 related to embodiment 100, but having a different arrangement of isolators. Specifically, embodiment 500 has isolators 112A, 112B toward the front (i.e., the end of the motor support structure 140 farther from the mounting surface 120) as in embodiment 100. However, instead of the isolators 114A, 114B shown for embodiment 100, embodiment 500 has two pairs of isolators configured to couple the motor support structure 140 to the interior rear surface 126 of the housing 110 behind the mounting surface 120. As shown, these two pairs of isolators (514A, 514B and 516A, 516B) couple the motor support structure 140 to the interior rear surface 126 horizontally. These isolators are arranged symmetrically about the lateral midplane (as indicated and described above in connection to FIG. 2) of the motor support structure 140 and a vertical midplane of the motor support structure 140. The approximate position of the vertical midplane is indicated by the line 134 which represents the intersection of the vertical midplane with the interior rear surface 126 (i.e., the vertical midplane is perpendicular to both the mounting surface 120 and the lateral midplane; see FIG. 2 for line 132 and accompanying description of the orientation of the lateral midplane).

It will be appreciated that features of embodiments described herein provide a number of advantages such as over conventional motor mounting approaches, such as those disclosed above. Some such advantages are now discussed in greater detail. As a first example, when a motor and additional subsystems are assembled within a housing such as the housing 110 of embodiment 100, the motor may be supplied within the housing 110 as a unified modular assembly. In many environments it is highly desirable to reduce downtime caused by motor failures (or failures of associated control systems). When the motor (and, optionally, control systems) is supplied as a unified modular assembly, the entire assembly can be replaced, returning the aircraft to service without the need to first diagnose the origin of the failure and/or disassemble components of the propulsion systems (and, optionally, control systems as well).

Incorporation of a robust vibration isolation system (such as the example 4-point system of embodiment 100, which supports a motor against excessive vibration-induced pitch, yaw, and roll) allows the motor housing to be supported entirely by bracket without the need to install customized vibration isolation systems customized for each intended aircraft (or other vehicle). This feature in turn enables the quick-connect (and quick disconnect) features of the embodiments herein, allowing the motor to be connected and disconnected from an aircraft body, for example, in a single motion without the need for numerous tools. The above functionality enabled by the embodiments herein even further reduces the time required to return an aircraft (or other vehicle) experiencing motor or control problems into service, particularly in environments such as combat environments where carrying a large toolkit may be impractical and where trained mechanics may not be available.

Additionally, motor performance can vary significantly when the motor experiences strong vibrations and other forces. Conventional motor assemblies and mounts incorporating vibration isolation are provided as separate components chosen by aircraft manufacturers or operators. As a result, a motor provided to an aircraft user may have the desired performance characteristics when initially tested and tuned by a motor provider, yet perform unsatisfactorily when assembled into an aircraft depending on the particular mounting and vibration isolation components chosen by an intermediate motor assembly supplier or end user. For example, a motor may be tuned to maintain a desired fuel/air ratio while on a test stand but deviate significantly from the desired fuel/air ratio when mounted in an air frame due mounting and vibration isolation configurations which are deficient or merely different from the test conditions.

It should be appreciated that embodiments such as example embodiment 100 are highly-adaptable to motors of varying size and geometry; specifically, the motor support framework 140 and the shape of the housing 110 may be adapted to accommodate nearly any particular motor. In particular, the motor support framework 140 may comprise various discrete mechanical components which are designed to be assembled around a particular motor (or general category of motor) and rigidly coupled to it such that the motor can be securely supported within the housing 110. More broadly, it should be appreciated that no description herein should be interpreted to constrain the materials or manner of manufacture of any component. For example, components may be made from any number of materials including steel, aluminum, and fiberglass or carbon fiber composites, and so on. Similarly, components may be formed any combination of extrusion, casting, welding, 3D printing, and so on.

The foregoing description and accompanying drawings illustrate principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

We claim:

1. A motor mounting system comprising:
a mounting surface configured to form an exterior rear face of a housing, the mounting surface configured to fixedly fasten to a structural member by mating with a quick-connect bracket disposed on the structural member;
a motor support framework configured to couple to an interior rear face of the housing opposite the mounting surface; and
an extended support configured to form part of the housing by coupling to an outer edge of the housing near the mounting surface;
wherein the extended support, when arranged to form part of the housing, is a cantilevered support extending along a cantilever axis perpendicular to the mounting surface and has:
a first end coupled to the outer edge of the housing near the mounting surface; and
a second end configured to couple to the motor support framework by a plurality of vibration isolation devices near the second end, the plurality of vibration devices including at least a first isolator and a second isolator.

2. The mounting system of claim 1:
wherein, when the motor support framework is assembled as part of the housing and configured to support a motor:
the first and second isolators are disposed symmetrically with respect to a lateral midplane of the motor support framework, the lateral midplane being parallel to the cantilever axis and substantially perpendicular to a surface of the cantilevered support; and the motor support framework is configured to be at least partially suspended from the cantilevered support by the plurality of vibration isolation devices in a vertical direction substantially perpendicular to the cantilever axis and substantially parallel to the lateral midplane.

3. The mounting system of claim 2 wherein the mounting system further comprises a plurality of vertical supports extending from the interior rear face of the housing, and
wherein, when the motor support framework is assembled as part of the housing and configured to support a motor:
the motor support framework is coupled to the vertical supports of the housing by a second plurality of vibration isolation devices, the second plurality of vibration isolation devices including a third isolator and a fourth isolator disposed symmetrically about the lateral midplane of the motor support framework; and
the motor support framework is configured to be at least partially suspended from the plurality of vertical supports by the second plurality of vibration isolation devices in a vertical direction substantially perpendicular to the axis of the cantilevered support and the lateral midplane.

4. The mounting system of claim 3, wherein the system further comprises a mounting bracket, the mounting bracket being the quick-connect bracket; and
wherein the outer edge of the housing extends between the exterior rear face and the interior rear face of the housing and is provided with a set of recesses, each recess dimensioned to receive a clip dimensioned to fixedly engage that recess, each clip forming part of the mounting bracket.

5. The mounting system of claim 4, wherein the mounting bracket has an elliptical annular shape.

6. The mounting system of claim 2, wherein the mounting system further comprises a plurality of anchor points on the interior rear face of the housing, and
wherein, when the motor support framework is assembled as part of the housing and configured to support a motor:
the motor support framework is coupled to the anchor points by a second plurality of vibration isolation devices, the second plurality of vibration isolation devices including at least a third isolator and a fourth isolator disposed symmetrically about the lateral midplane of the motor support framework and extending in a horizontal direction substantially perpendicular to the mounting surface; and
the motor support framework is configured to be at least partially suspended from the anchor points by the second plurality of vibration isolation devices.

7. The mounting system of claim 6, wherein the second plurality of vibration isolation devices further comprises at least a fifth isolator and a sixth isolator and
wherein, when the motor support framework is assembled as part of the housing and configured to support a motor:
the fifth and sixth isolators are disposed symmetrically about the lateral midplane of the motor support framework and extend in a horizontal direction substantially perpendicular to the mounting surface; and
the isolators of the second plurality of vibration isolation devices are further disposed symmetrically about a vertical midplane of the motor support framework, the vertical midplane being perpendicular to the lateral midplane.

8. The mounting system of claim 6, wherein the system further comprises a mounting bracket, the mounting bracket being the quick-connect bracket; and
wherein the outer edge of the housing extends between the exterior rear face and the interior rear face of the housing and is provided with a set of recesses, each recess dimensioned to receive a clip dimensioned to fixedly engage that recess, each clip forming part of the mounting bracket.

9. The mounting system of claim 8, wherein the mounting bracket has an elliptical annular shape.

10. The mounting system of claim 2, wherein the mounting surface is provided with one or more ports, each port dimensioned to couple to one of:
a fuel supply port of a motor
an electrical power supply port of the motor
an electronic flight control module of the motor.

11. The mounting system of claim 10, wherein at least one of the one or more ports is a quick-connect receptacle dimensioned and configured to allow a cable to be coupled and decoupled from that port without the use of any tool.

12. A motor mounting system comprising:
a housing having a mounting surface configured to form an exterior rear face of the housing and further configured to be fixedly fastened to a structural member;
a motor support framework configured to couple to an interior rear face of the housing opposite the exterior rear face of the housing;
an extended support configured to couple to an outer edge of the mounting surface and having:
a first end coupled to an outer edge of the interior rear face of the housing; and
a second end coupled to the motor support framework by a set of vibration isolation devices near the second end; and
wherein the outer edge extends between the exterior rear face and the interior rear face of the housing and is provided with a set of recesses, each recess dimensioned to receive a fastener dimensioned to fixedly engage that recess.

13. The mounting system of claim 12, further comprising:
a mounting bracket having a bracket body, the mounting bracket being a quick-connect bracket;
a plurality of clips extending from the bracket body, each clip having a proximal end coupled to the bracket body and a distal end having a protrusion forming a key dimensioned to engage a corresponding recess in the outer edge of the housing.

14. The mounting system of claim 13,
wherein the plurality of clips includes one or more spring-loaded clips, each spring-loaded clip having a spring and configured to pivot about the proximal end of that clip;
wherein the spring of each spring-loaded clip biases that clip in a closed position with the distal end oriented along a first direction perpendicular to a plane occupied by the bracket body;
wherein each clip is configured to pivot into an open position by pivoting away from a center of the bracket body toward a second direction upon an application of a force to that clip having a component in a direction parallel to the second direction, the second direction pointing away from a center of the bracket body and parallel to the plane occupied by the bracket body; and wherein, when each clip is aligned with the corresponding recess and a displacement of the mounting surface relative to the bracket body is less than a minimum displacement, the bracket is configured to fixedly couple to the housing and support the housing.

15. The mounting system of claim 14, wherein the mounting bracket has an elliptical annular shape.

16. The mounting system of claim 14,
wherein the extended support, when coupled to the outer edge of the mounting surface, is a cantilevered support extending along a cantilever axis perpendicular to the mounting surface, the cantilevered support having:
   the first end coupled to the outer edge of the housing near the mounting surface; and
   the second end configured to couple to the motor support framework by a plurality of vibration isolation devices near that end, the plurality of vibration devices including at least a first isolator and a second isolator; and
wherein, when the motor support framework is assembled as part of the housing and configured to support a motor:
   the first and second isolators are disposed symmetrically with respect to a lateral midplane of the motor support framework, the lateral midplane being parallel to the cantilever axis and substantially perpendicular to a surface of the cantilevered support; and
   the motor support framework is configured to be at least partially suspended from the cantilevered support by the plurality of vibration isolation devices in a vertical direction substantially perpendicular to the cantilever axis and substantially parallel to the lateral midplane.

17. The mounting system of claim 16, wherein the mounting bracket has an elliptical annular shape.

18. A motor mounting system comprising:
   a mounting surface configured to form an exterior rear face of a housing, the mounting surface configured to fixedly fasten to a structural member by mating with a bracket disposed on the structural member;
   a motor support framework configured to couple to an interior face of the housing opposite the mounting surface; and
   an extended support configured to form part of the housing by coupling to an outer edge of the housing near the mounting surface;
   wherein the extended support, when arranged to form part of the housing, is a cantilevered support extending along a cantilever axis perpendicular to the mounting surface having:
   a first end coupled to the outer edge of the housing near the mounting surface; and
   a second end configured to couple to the motor support framework by a plurality of vibration isolation devices near the second end, the plurality of vibration devices including at least a first isolator and a second isolator.

* * * * *